United States Patent
Srivastava et al.

(10) Patent No.: US 9,762,591 B2
(45) Date of Patent: Sep. 12, 2017

(54) MESSAGE SENDER AUTHENTICITY VALIDATION

(71) Applicant: McAfee, Inc., Santa Clara, CA (US)

(72) Inventors: Neeta Srivastava, San Jose, CA (US); Yi Zheng, Cupertino, CA (US); Jeremy Bennett, San Carlos, CA (US)

(73) Assignee: McAfee, Inc., Santa Clara, CA (US)

( * ) Notice: Subject to any disclaimer, the term of this patent is extended or adjusted under 35 U.S.C. 154(b) by 12 days.

(21) Appl. No.: 14/583,622

(22) Filed: Dec. 27, 2014

(65) Prior Publication Data

US 2016/0191542 A1    Jun. 30, 2016

(51) Int. Cl.
*H04L 29/00* (2006.01)
*H04L 29/06* (2006.01)

(52) U.S. Cl.
CPC ........ *H04L 63/123* (2013.01); *H04L 63/0227* (2013.01); *H04L 63/0876* (2013.01); *H04L 63/1408* (2013.01); *H04L 63/1425* (2013.01)

(58) Field of Classification Search
CPC ... H04L 63/123; H04L 9/3247; H04L 63/105; H04L 63/14; H04L 63/061; H04L 9/006; H04L 63/102
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 7,801,961 B2 * | 9/2010 | Sachtjen | G06Q 10/107 709/206 |
| 2004/0236838 A1 * | 11/2004 | Tout | G06F 21/554 709/207 |
| 2009/0106557 A1 | 4/2009 | Leonard | |
| 2010/0257358 A1 * | 10/2010 | Grajek | H04L 9/3263 713/158 |

(Continued)

FOREIGN PATENT DOCUMENTS

WO    2016105867    6/2016

OTHER PUBLICATIONS

Anupama Aggarwal et al., "PhishAri: Automatic Realtime Phishing Detection on Twitter." In: eCrime Researchers Summit (eCrime), Oct. 23-24, 2012, pp. 1-12.

(Continued)

*Primary Examiner* — Ghazal Shehni
(74) *Attorney, Agent, or Firm* — Patent Capital Group

(57) ABSTRACT

In an example, a system and method are provided for validating the sender of a message, such as an e-mail, text message, voice mail, network message, internet posting, or other electronic message. An authenticity server engine may first prescreen the message with anti-spam, anti-malware, and other filters. The screened message is then provided to the end user. If the end user deems the message suspicious, he may request additional validation. The authenticity server engine may then apply an example four-phase validation scheme, including analyzing header data for consistency with the message body, analyzing public data sources, analyzing private data sources, and receiving a result of an off-channel challenge to the sender. The server may then assign the message a sender validity confidence score.

20 Claims, 6 Drawing Sheets

(56) References Cited

U.S. PATENT DOCUMENTS

2011/0247045 A1* 10/2011 Rajagopal ............... H04L 63/08
726/1
2014/0259158 A1   9/2014 Brown et al.
2014/0298464 A1  10/2014 Xavier et al.

OTHER PUBLICATIONS

Eiloart, "1101. What is sender verification?", http://www.sussex.ac.uk/its/help/faq?facid=1101, Aug. 5, 2004, printed Aug. 15, 2014.
Patrick Dwyer et al., "MDMap: Assisting Users in Identifying Phishing Emails.", In: Proceedings of 7th Annual Collaboration, Electronic Messaging, Anti-Abuse and Spam Conference (CEAS), Jul. 13-14, 2010, pp. 1-4.
PCT International Search Report and Written Opinion in International Application No. PCT/US2015/062865 mailed on Apr. 22, 2016, 12 pages.
Wikipedia, "Callback", http://en.wikipedia.org/wiki/Callback; printed Aug. 15, 2014.
Wikipedia, "Email authentication", http://en.wikipedia.org/wiki/Email_authentication; printed Aug. 15, 2014.

* cited by examiner

MESSAGE SENDER AUTHENTICITY VALIDATION

FIELD OF THE DISCLOSURE

This application relates to the field of electronic security, and more particularly to a system and method for message sender authenticity validation.

BACKGROUND

In the field of computer security, so-called "phishing" is one of many attack vectors that may be used to compromise a user's private data or system resources. In a general sense, phishing is an act of social engineering. In one example of a phishing attack, a sender provides to a recipient a message containing falsified data designed to deceive the recipient into sending back to the sender sensitive information or property. For example, in a common phishing attack, a malicious sender pretends to be a friend of an end-user recipient. The malicious sender provides a message, such as an email or a text message, saying that he is trapped in a foreign country, and needs the recipient to wire him money so that he can return home. If the recipient sends money to the malicious sender, the malicious sender absconds with the money, never to be seen again.

In another form of social engineering attack, a malicious sender pretends to be an official working for a company, and requests that the recipient provide network credentials. If the recipient provides the credentials to the malicious sender, then the malicious sender may gain access to an enterprise network, and may work mischief. Many other types of social engineering attacks are used, and may take the basic form of a malicious sender sending to a recipient a message containing falsified information for the purpose of procuring information or property.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
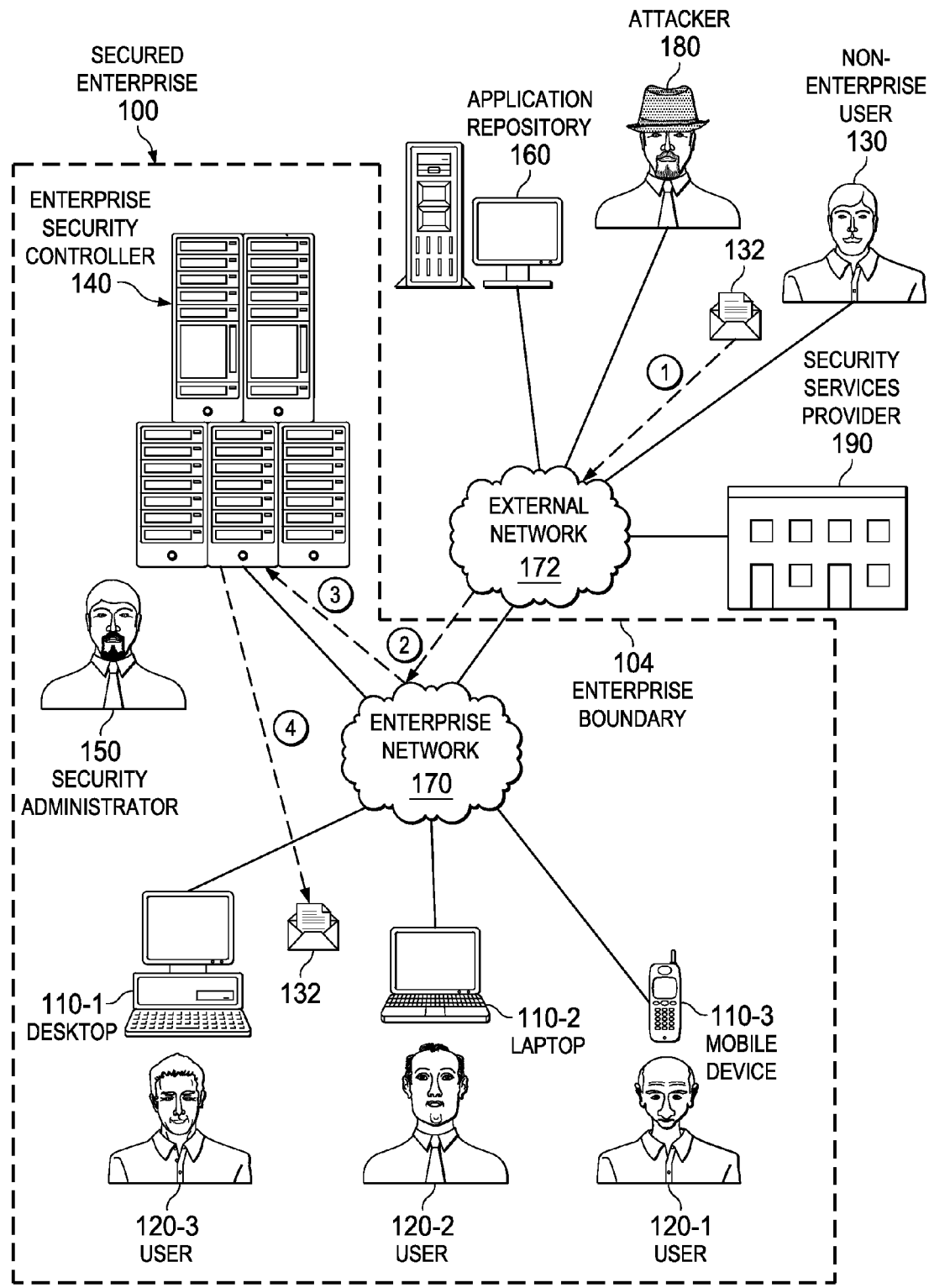
FIG. 1 is a block diagram of a security-enabled network according to one or more examples of the present Specification.

In an example, a system and method are provided for validating the sender of a message, such as an e-mail, text message, voice mail, network message, internet posting, or other electronic message. An authenticity server engine may first prescreen the message with anti-spam, anti-malware, and other filters. The screened message is then provided to the end user. If the end user deems the message suspicious, he may request additional validation. The authenticity server engine may then apply an example four-phase validation scheme, including analyzing header data for consistency with the message body, analyzing public data sources, analyzing private data sources, and receiving a result of an off-channel challenge to the sender. The server may then assign the message a sender validity confidence score.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments many have different advantages, and no particular advantage is necessarily required of any embodiment.

Although many users have become aware of social engineering attacks, and are thus more difficult to deceive, social engineering attacks themselves have become more sophisticated, and thus more credible. In one example of a social engineering attack, the attacker gleans identifying information about a friend of the target, and masquerades as that specific friend. If the information that the attacker has gleaned is sufficiently credible and detailed, the target may be deceived into thinking that the request is legitimately from the friend, and the target may then provide the requested information or property to the attacker.

In one example, the attacker sends to the recipient a message such as the following:

Hi Jim! This is Steve. As you probably heard, I have been vacationing in Bangladesh for a couple weeks. It was a real blast until last night. Somebody stole my wallet on the street, and it contained all of my travelers checks and credit cards. Fortunately, my passport was back in the hotel room (like they advised us to do), so I'll be able to get back to the states. But I'm totally broke. I hate to ask this, but I'm really desperate right now. Is there any way that you could send me some money over Western Union so that I can make my way back home? $5,000 should be enough to put me up in a room for a night or two, get me a plane ticket back home to Austin, and get me safely back to the house. I've got some money stashed away in savings, and I promise I will pay you back the minute I get home. Thank you so much! You're a lifesaver! Sincerely, Steve.

In this example, the attacker may have compromised Steve's identity, and gained access to his address book and other personally identifying information. The attacker may then send out a mass email to everybody in Steve's address book with the same message, using a program or a macro to fill in the name of the recipient. A large majority of Steve's contacts may properly identify the message as a social engineering attack, or may decide that even if the message is real, they're not willing to send Steve $5,000. However, the number of contacts that are yielded by a single successful data breach may be large enough to overcome the low individual probability. Specifically, if the attacker sends the fake Steve message to a large enough number of recipients, the odds increase that at least one of those will be fooled by the message, and will be willing to lend Steve $5,000 to return home from Bangladesh.

However, a sender authenticity validator according to the present specification may protect that user from being scammed by the attacker. Specifically, the sender authenticity validator of the present specification may assign the message a credibility score. If the message is insufficiently credible, the sender authenticity validation engine may warn the user that this message may be a social engineering attack. This may protect the user from losing money and resources. This may also protect the user's enterprise from losing valuable trade secret information if the object of the attack is proprietary information rather than money.

In one example, sender authenticity validation includes a four-phase analysis. In phase 1, a sender authenticity validation server may analyze the message to determine whether metadata for the message, such as the header information of an email, are consistent with the contents of the message itself. For example, if the message from Steve is found to have originated in Mozambique, then the message may receive a lower credibility score, because a message from a user stranded in Bangladesh is unlikely to originate from Mozambique.

In phase 2 of the validation effort, the sender authenticity validation engine may analyze publicly available information and resources to cross-reference the reliability and validity of the message. For example, in this message, Steve says that he lost all of his travelers checks because he was robbed on a street in Bangladesh. The sender authenticity validation engine may subscribe to a number of public data aggregation sources, such as LEXIS-NEXIS, Dun & Bradstreet, newspapers, archives, relevant blogs, and other similar data aggregators, and may search relevant databases to determine whether matching information can be found. For example, if a search of newspaper archives yields a police blotter indicating that a person matching Steve's name and description was robbed in Bangladesh on the date he claims, this may increase the credibility score of the message. If a search of public records further confirms that the e-mail address is several years old, the credibility score may go even higher. Conversely, if no corroborating information can be found, or if negatively corroborating information is found, such as a report that there were no street burglaries in Bangladesh yesterday, and if the e-mail account is only a few days old, then the message's credibility score may be lowered.

After performing the first two phases of the validity analysis, the sender authenticity validation server may provide a preliminary credibility score to the requesting user. The preliminary score may also provide a detailed report, including a breakdown of corroborating or negatively corroborating information.

The credibility score itself may take the form of a percentage confidence that these sender is authentic. If the end-user is satisfied after this report that the user is authentic, he may take appropriate action. For example, if the first two phases yield a police report that a person matching Steve's name and description was robbed on the day that he claims in Bangladesh, and if the originating IP address of the message corresponds to a public Internet café in Bangladesh, or to a hotel where the user knows that Steve was staying, the user may be satisfied that the message is authentic, and may decide to be a friend and send Steve some money to help them get home.

On the other hand, if the first two phases yield sufficiently negative corroborating information, the result may be a confidence score indicating to Jim's satisfaction that the sender is not valid. In one extreme example, a search of LEXIS-NEXIS may return an obituary indicating that Steve died in a car accident a month ago. In that case, it is extremely unlikely that he is in Bangladesh asking for money. In another example, analysis of header data may indicate that the message originated from an area that is known to be a hub of social engineering attacks. In these cases, the user may opt to simply ignore the message and report it as fraudulent.

A third option is for the user to request additional validation analysis in phase 3. Phase 3 includes searching private information sources that the sender authenticity validation engine cannot access without permission and credentials from the end-user. Thus, for example, the sender authenticity validation server may offer to perform additional analysis if Jim will provide credentials for logging in to network services, such as Twitter, LinkedIn, Facebook, and other similar services. In one example, provision of these credentials and proceeding with phase 3 is completely optional to the user. If user does choose to provide the credentials and move forward with phase 3, then the sender authenticity validation engine may receive the credentials, log into the appropriate services, and analyze those private data sources to determine whether it can find appropriate information about Steve and his activities. For example, Steve may had posted on his Facebook page that he is heading to Bangladesh for a vacation, and he may have posted pictures that are tagged in Bangladesh. In this case, there is a positive correlation to sender authenticity. On the other hand, if Steve's Facebook page indicates that he is in the middle of a rush at work, that he is buried under projects, and can barely get away from the office, this may be a negative correlation to sender authenticity. In a more extreme example, Steve's Facebook page may indicate that he is currently vacationing in Australia, making it extremely unlikely that he has accidentally found his way to Bangladesh India.

After completing the analysis of phase 3, the sender authenticity validation engine may provide back to the end-user an updated credibility score. The user may then decide to act on the updated score, or may proceed to phase 4.

In phase 4, the user may provide a challenge to verify the authenticity of the sender. For example, if Jim receives Steve's message via email, he may also have Steve's cell phone number. To verify that he is really talking to Steve, he may send Steve a text message asking if Steve really did send the message. A useful feature of this verification method is that it may be completely out of band from the original message. The email and text message operate independently, and the fact that an attacker has compromised Steve's email address does not necessarily imply that there are also able to intercept and appropriately respond to text messages sent to Steve's phone number. Thus, Jim may provide an appropriate challenge, optionally via an alternative communication channel, and await a satisfactory response. If Steve responds that he has no idea what the user is talking about, then the message is probably invalid. If Steve responds yes, he did send the email, and he's really desperate for some help, then the user may decide whether he is in a position to help Steve, and is willing to do so.

Sender authenticity validation may also beneficially be used in verifying the identity of remote persons that are not previously known to the user. For example, a person posting goods or services available on a classifieds site such as Craigslist may make certain claims about his or her location, and the goods or services available. A safety-conscious and savvy user may want to verify, to a degree of confidence, that the seller is who he says he is, and that the posting is not a scam.

A system and method for sender authenticity validation will now be described with more particular reference to the appended FIGURES.

FIG. 1 is a network-level diagram of a secured enterprise 100 according to one or more examples of the present Specification. In the example of FIG. 1, a plurality of users 120 operate a plurality of client devices 110. Specifically, user 120-1 operates desktop computer 110-1. User 120-2 operates laptop computer 110-2. And user 120-3 operates mobile device 110-3.

Each computing device may include an appropriate operating system, such as Microsoft Windows, Linux, Android, Mac OSX, Apple iOS, Unix, or similar. Some of the foregoing may be more often used on one type of device than another. For example, desktop computer 110-1, which in one embodiment may be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

One or more computing devices configured as an enterprise security controller (ESC) 140 may also operate on enterprise network 170. ESC 140 may provide a user interface for a security administrator 150 to define enterprise security policies, which ESC 140 may enforce on enterprise network 170 and across client devices 120.

Secured enterprise 100 may encounter a variety of "security objects" on the network. A security object may be any object that operates on or interacts with enterprise network 170 and that has actual or potential security implications. In one example, object may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Enterprise security policies may include authentication policies, network usage policies, network resource quotas, antivirus policies, and restrictions on executable objects on client devices 110 by way of non-limiting example. Various network servers may provide substantive services such as routing, networking, enterprise data services, and enterprise applications.

Secure enterprise 100 may communicate across enterprise boundary 104 with external network 172. Enterprise boundary 104 may represent a physical, logical, or other boundary. External network 172 may include, for example, websites, servers, network protocols, and other network-based services. In one example, an application repository 160 is available via external network 172, and an attacker 180 (or other similar malicious or negligent actor) also connects to external network 172.

It may be a goal of users 120 and secure enterprise 100 to successfully operate client devices 110 without interference from attacker 180 or from unwanted security objects. In one example, attacker 180 is a malware author whose goal or purpose is to cause malicious harm or mischief. The malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this Specification, malicious software ("malware") includes any security object configured to provide unwanted results or do unwanted work. In many cases, malware objects will be executable objects, including by way of non-limiting examples, viruses, trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 180 may also want to commit industrial or other espionage against secured enterprise 100, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a client device 110. Buffer overruns may be the result, for example, of poor input validation or use of insecure libraries, and in many cases arise in nonobvious contexts. Thus, although not malicious himself, a developer contributing software to application repository 160 may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new Application repository 160 may represent a Windows or Apple "app store" or update service, a Unix-like repository or ports collection, or other network service providing users 120 the ability to interactively or automatically download and install applications on client devices 110. If application repository 160 has security measures in place that make it difficult for attacker 190 to distribute overtly malicious software, attacker 190 may instead stealthily insert vulnerabilities into apparently-beneficial applications.

In some cases, secured enterprise 100 may provide policy directives that restrict the types of applications that can be installed from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 120.

Secured enterprise 100 may also contract with or subscribe to a security services provider 190, which may provide security services, updates, antivirus definitions, patches, products, and services. McAfee®, Inc. is a nonlimiting example of such a security services provider that offers comprehensive security and antivirus solutions.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

Collectively, any object that is or can be designated as belonging to any of the foregoing classes of undesirable objects may be classified as a malicious object. When an unknown object is encountered within secured enterprise 100, it may be initially classified as a "candidate malicious object." This designation may be to ensure that it is not granted full network privileges until the object is further analyzed. Thus, it is a goal of users 120 and security administrator 150 to configure and operate client devices 110 and enterprise network 170 so as to exclude all malicious objects, and to promptly and accurately classify candidate malicious objects.

In this example, attacker 180 may use malware hosted an application repository 160 to gain access to credentials for a non-enterprise user 170. Attacker 180 may then attempt to use a message ostensibly from non-enterprise user 170 to select information or resources from user 120-3 with in enterprise boundary 104. This may implicate normally personal and private property of user 120-3, but also proprietary information owned by secured enterprise 100. Thus, it is in the interests of secured enterprise 100 to protect user 120-3 from the social engineering attack, and it is also in user 120-threes interest to recognize the attack and respond to it appropriately.

In one example, in operation 1, a message 132 is delivered to external network 172, ostensibly from non-enterprise user 130. However, message 132 may have in fact originated from either one of non-enterprise user 130 or attacker 180. It is therefore advantageous to correctly identify whether the sender of message 132 is authentically and validly non-enterprise user 130, or some other person or entity such as attacker 180.

In operation 2, external network 172 delivers message 132 to enterprise network 170.

In operation 3, enterprise network 170 routes message 132 to enterprise security controller 140. Enterprise security controller 140 may apply standard anti-malware, anti-phishing, anti-spyware, or other security filters to message 132.

In operation 4, if message 132 passes these filters, message 132 is delivered to desktop machine 110-1 operated by user 120-3.

User 120-3 may open message 132, and may determine that message 132 is suspicious. Thus, user 120-3 may want additional verification that the sender of message 132 is legitimately non-enterprise user 130 before acting on message 132.

In operation 5, user 120-3 forward message 132 to services provider 190. Security services provider 190 may operate a sender authenticity validation server. It should be noted that security services provider 190 is shown separately from enterprise security controller 140 by way of example only. In some cases, security services provider 190 may be internal to secured enterprise 100, or enterprise security controller 140 may provide services, including acting as a sender authenticity validation server.

In operation 5, user 120-3 provides to security services provider 190 a request to analyze message 132.

In operation 6, security services provider 190 provides back to user 120-3 a message indicating a credibility score. User 120-3 may then decide how to act on the confidence score. As described above, operations 5 and 6 may include some back and forth between user 120-3 and security services provider 190. For example, security services provider 190 may provide phase 1 and phase 2 of analysis as described above, and then provide an credibility score to user 120-3. This may include a request to perform additional analysis on private data sources. If user 120-3 decides to move forward with phase 3, then user 120-3 provides back to security services provider 190 security credentials for appropriate services. Security services provider 190 may then provide back to user 120-3 an updated credibility score for message 132. Thus, the designation out of operations 5 and 6 as single operations should be understood to be a nonlimiting example.

Figure 2:
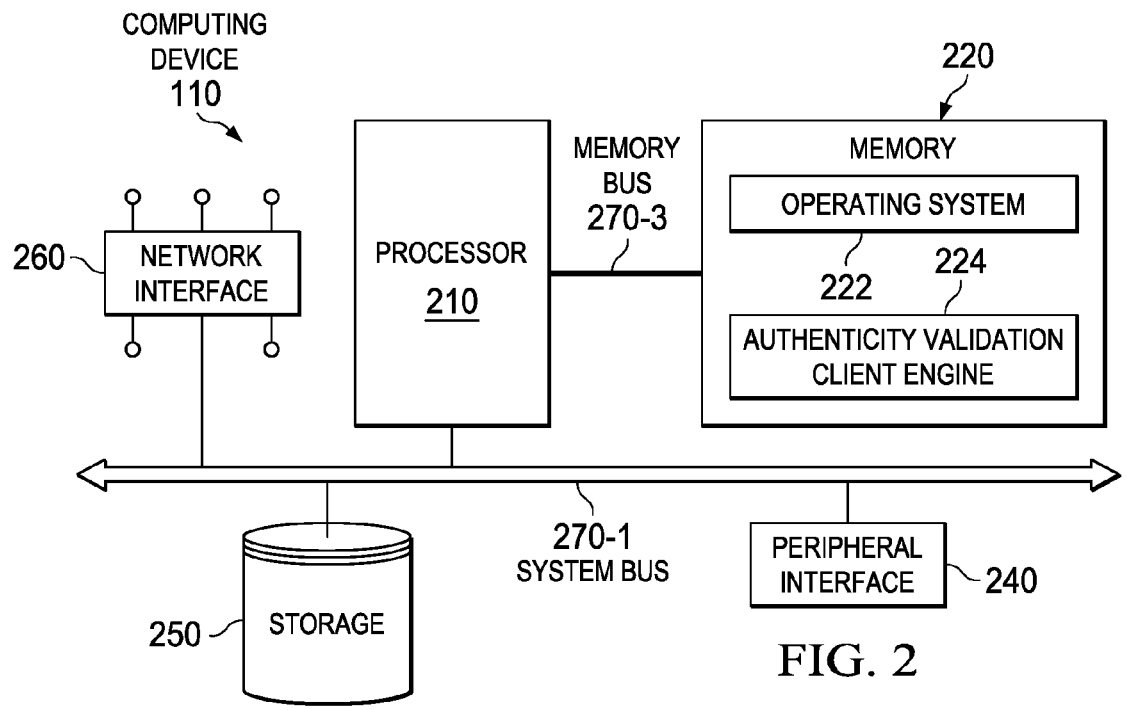
FIG. 2 is a block diagram of a client device according to one or more examples of the present Specification.

FIG. 2 is a block diagram of client device 110 according to one or more examples of the present Specification. Client device 110 may be any suitable computing device. In various embodiments, a "computing device" may be or comprise, by way of non-limiting example, a computer, workstation, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data Client device 110 includes a processor 210 connected to a memory 220, having stored therein executable instructions for providing an operating system 222 and at least software portions of a authenticity validation client engine 224. Other components of client device 110 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this Specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of authenticity validation client engine 224. Many other configurations are also possible, and are intended to be encompassed within the broad scope of this Specification.

Network interface 260 may be provided to communicatively couple client device 110 to a wired or wireless network. A "network," as used throughout this Specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Authenticity validation client engine 224, in one example, is operable to carry out computer-implemented methods according to this Specification. Authenticity validation client engine 224 may include one or more non-transitory computer-readable mediums having stored thereon executable instructions operable to instruct a processor to provide a security engine. As used throughout this Specification, an "engine" includes any combination of one or more logic elements, of similar or dissimilar species, operable for and configured to perform one or more methods provided by the engine. Thus, authenticity validation client engine 224 may comprise one or more logic elements configured to provide methods as disclosed in this Specification. In some cases, authenticity validation client engine 224 may include a special integrated circuit designed to carry out a method or a part thereof, and may also include software instructions operable to instruct a processor to perform the method. In some cases, authenticity validation client engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that authenticity validation client engine 224 may also include other hardware and software, including configuration files, registry entries, and interactive or user-mode software by way of non-limiting example.

In one example, authenticity validation client engine 224 includes executable instructions stored on a non-transitory medium operable to perform a method according to this Specification. At an appropriate time, such as upon booting client device 110 or upon a command from operating system 222 or a user 120, processor 210 may retrieve a copy of authenticity validation client engine 224 (or software portions thereof) from storage 250 and load it into memory 220. Processor 210 may then iteratively execute the instructions of authenticity validation client engine 224 to provide the desired method.

Peripheral interface 240 may be configured to interface with any auxiliary device that connects to client device 110 but that is not necessarily a part of the core architecture of client device 110. A peripheral may be operable to provide extended functionality to client device 110, and may or may not be wholly dependent on client device 110. In some cases, a peripheral may be a computing device in its own right. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example.

Figure 3:
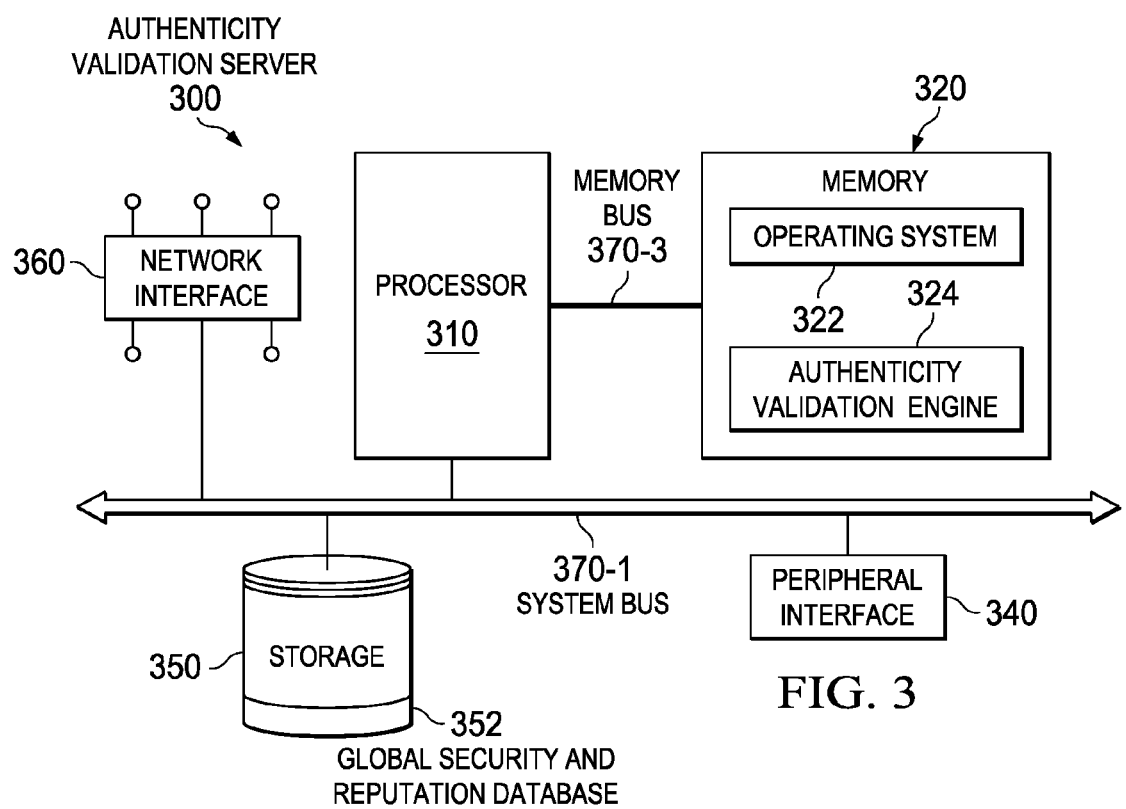
FIG. 3 is a block diagram of an authenticity validation server according to one or more examples of the present Specification.

FIG. 3 is a block diagram of authenticity validation server 300 according to one or more examples of the present Specification. Authenticity validation server 300 may be any suitable computing device, as described in connection with FIG. 2. In general, the definitions and examples of FIG. 2 may be considered as equally applicable to FIG. 3, unless specifically stated otherwise. Authenticity validation server 300 is described herein separately to illustrate that in certain embodiments, logical operations according to this Specification may be divided along a client-server model, wherein client device 110 provides certain localized tasks, while authenticity validation server 300 provides certain other centralized tasks. In some embodiments, authenticity validation server 300 may be a function of enterprise security server 140, may be a separate device operated by secured enterprise 100, or may be operated by a third party such as security services provider 190.

Authenticity validation server 300 includes a processor 310 connected to a memory 320, having stored therein executable instructions for providing an operating system 322 and at least software portions of a authenticity validation engine 324. Other components of authenticity validation server 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of authenticity validation engine 324.

In one example, storage 352, or another memory element, including a separate storage server or appliance, includes a global security and reputation database 352. Global security and reputation database 352 may include information consolidated from numerous encounters with malicious objects and candidate malicious objects. These data may be used to more fully and accurately characterize new candidate malicious objects encountered, including suspicious messages.

Network interface 360 may be provided to communicatively couple authenticity validation server 300 to a wired or wireless network, and may include one or more logic elements as described in FIG. 2.

Authenticity validation engine 324 is an engine as described in FIG. 2 and, in one example, includes one or more logic elements operable to carry out computer-implemented methods according to this Specification. Software portions of authenticity validation engine 324 may run as a daemon process.

Authenticity validation engine 324 may include one or more non-transitory computer-readable mediums having stored thereon executable instructions operable to instruct a processor to provide a security engine. At an appropriate time, such as upon booting authenticity validation server 300 or upon a command from operating system 222 or a user 120 or security administrator 150, processor 310 may retrieve a copy of authenticity validation engine 324 (or software portions thereof) from storage 350 and load it into memory 320. Processor 310 may then iteratively execute the instructions of authenticity validation engine 324 to provide the desired method.

Peripheral interface 340 may be configured to interface with any auxiliary device that connects to authenticity validation server 300 but that is not necessarily a part of the core architecture of authenticity validation server 300. A peripheral may be operable to provide extended functionality to authenticity validation server 300, and may or may not be wholly dependent on authenticity validation server 300. Peripherals may include, by way of non-limiting examples, any of the peripherals disclosed in FIG. 2.

Figure 4:
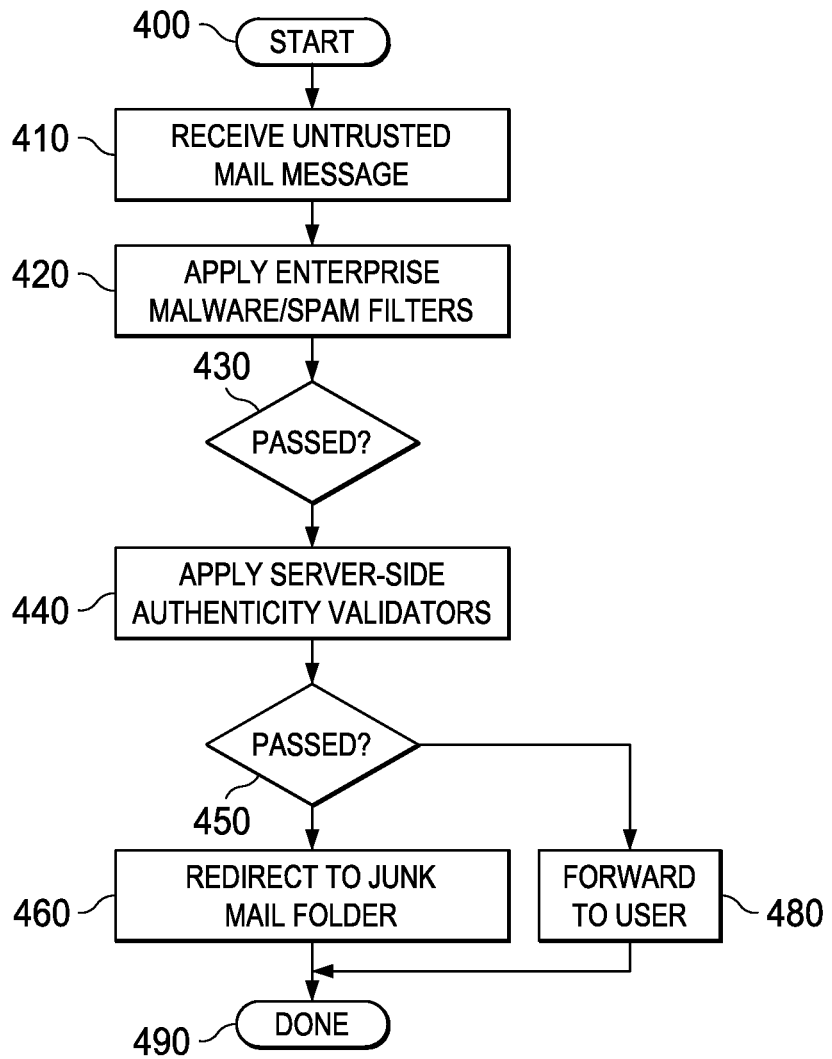
FIG. 4 is a flow chart of a according to one or more examples of the present Specification.

FIG. 4 is a flow diagram of a method 400 performed by authenticity validation engine 324 of validation server 300 according to one or more examples of the present specification.

In block 410, authenticity validation engine 324 receives an untrusted message, for example from user 120-3, with a validation request. Message 132 may be suspicious per se, or may contain a candidate malicious object, for example as an attachment.

In block 410, authenticity validation engine 324 may apply enterprise malware, spam, or other filters as described herein. It should be noted that message 132 may have already previously been screened by enterprise security controller 140. Thus, in some cases, block 420 represents the initial screening by enterprise security controller 140, while in other cases, validation server 300 may provide additional screening.

In block 430, if message 132 does not pass the enterprise malware or spam filters, then in block 460, message 132 is directed to a junk mail folder, or otherwise appropriately disposed of, and in block 490 the method is done.

Returning to block 430, if message 132 does plot pass the enterprise malware and spam filters, then in block 440, authenticity validation engine 324 applies server-side authenticity validators. These are described in greater detail in FIG. 6.

In block 450, if message 132 passes server-side authenticity validation, then in block 480, message 132 is returned to user 120-3. This may include providing a credibility score as described herein.

In block 490, the method is done.

Figure 5:
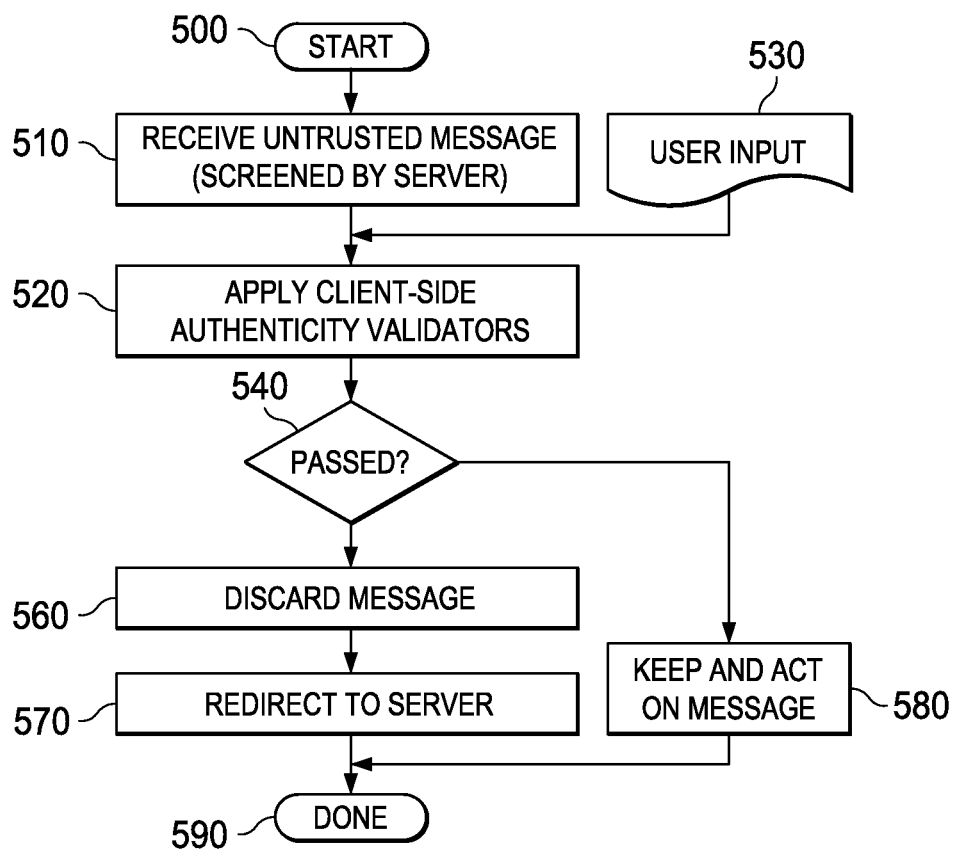
FIG. 5 is a flow chart of a method according to one or more examples of the present Specification.

FIG. 5 is a block diagram of a method 500 performed by validation client engine 224 according to one or more examples of the present specification.

In block 510, user 120-3 receives an untrusted message 132, ostensibly from non-enterprise user 130. The message may be suspect per se, or may include a candidate malicious object, for example as an attachment.

In block 520, user 120-3 requests analysis by security services provider 190, operating authenticity validation server 300.

In block 530, user 120-3 receives the analysis from the server, which may include a preliminary confidence score.

In block 540, user 120-3 applies client-side authenticity validators. These may receive user input 542, for example in the form of a challenge. Block 540 is described with greater specificity in connection with FIG. 7.

In decision block 550, if message 132 passes authenticity validation to the user's satisfaction, then in block 560, user 120-3 may keep and act on message 132, and in block 590 the method is done.

Returning to decision block 550, if message 132 does not pass authenticity validation, then in block 570, the user may discard message 132.

In block 580, the user may also optionally report message 132 to security services provider 190, which may use information about message 132 to update global security and reputation database 352.

In block 590, the method is done.

Figure 6:
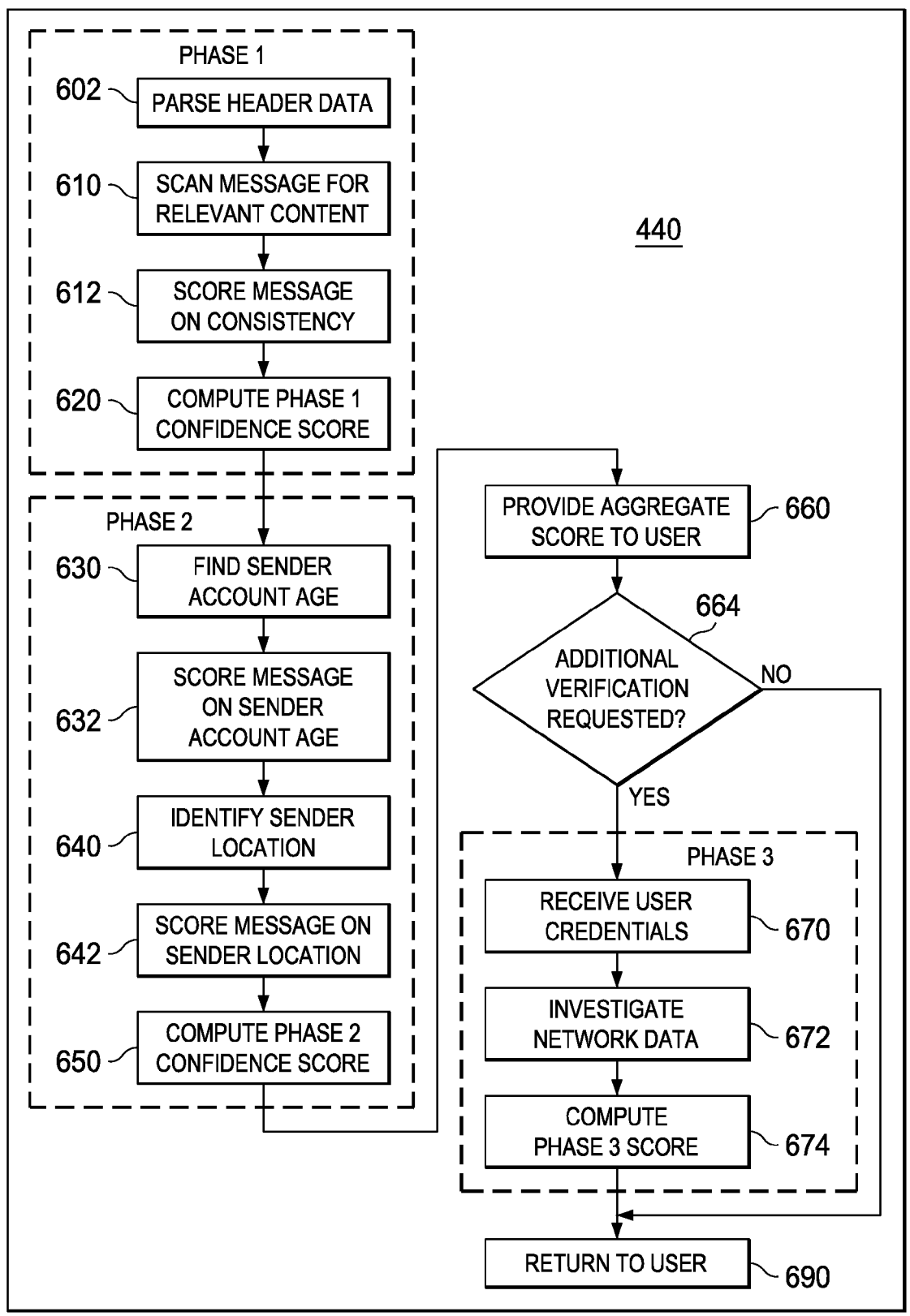
FIG. 6 provides a flow chart of a method according to one or more examples of the present Specification.

FIG. 6 provides a flowchart of selected operations performed in block 440 of FIG. 4.

Phase 1 begins in block 602. In block 602, authenticity validation engine 324 parses header data, metadata, or other relevant data from message 132.

In block 610, authenticity validation engine 324 scans the body of message 132 for relevant content.

In block 612, authenticity validation engine 324 provides a preliminary phase 1 score for message 132 based on consistency between the content of the body of message 132 and the metadata.

In block 620, authenticity validation engine 324 computes an overall phase 1 confidence score for message 132.

Phase 2 begins in block 630. In phase 2, authenticity validation engine 324 applies additional scoring factors, based on publicly available data sources, including for-pay or subscription data sources.

In block 630, authenticity validation engine 324 may score message 132 based on sender account age. In other words, a very new account may receive a much lower score, while an older account is more indicative of a legitimate user, and may receive a higher score.

In block 640, authenticity validation engine 324 may attempt to identify the sender's location.

In block 642, authenticity validation engine 324 scores the message on sender location, including consistency with data that were scanned in phase 1. The message location score of block 642 may also include validation based on whether the location is believed to be a hotspot for malicious activity.

In block 650, authenticity validation engine 324 computes a composite phase 2 confidence score. Control then passes through off page connector A to FIG. 6B.

On FIG. 6B, in block 660, authenticity validation engine 324 computes and provides an aggregate score for phases 1 and 2 to user 130-2.

In decision block 664, the user may inspect the aggregate score for phases 1 and 2, and decide whether to proceed with phase 3. If the user subjectively feels that the score is adequate, then he may simply act on the message. Conversely, if user 130-2 decides that the aggregate score for phases 1 and 2 is low enough, the user may simply decide to treat the message as malware. However, between the two extremes is a great deal of uncertainty. If user 130-2 is still uncertain, he may elect to proceed with phase 3.

Phase 3 begins in block 670. In block 670, authenticity validation engine 324 receives user credentials. This may include credentials, for example, to social media sites, or for accounts that the user holds for data services.

In block 672, authenticity validation server 324 investigates available network data from these private data sources. This may include logging on to those data sources as though user 130-2, and collecting information about sender 130 where it is available.

In block 674, authenticity validation engine 324 may compute an aggregate phase 3 score. The aggregate phase 3 score may incorporate the scores from phases 1 and 2.

In block 690, authenticity validation engine 324 returns control to user 120-3. This may include providing an updated score as necessary.

Figure 7:
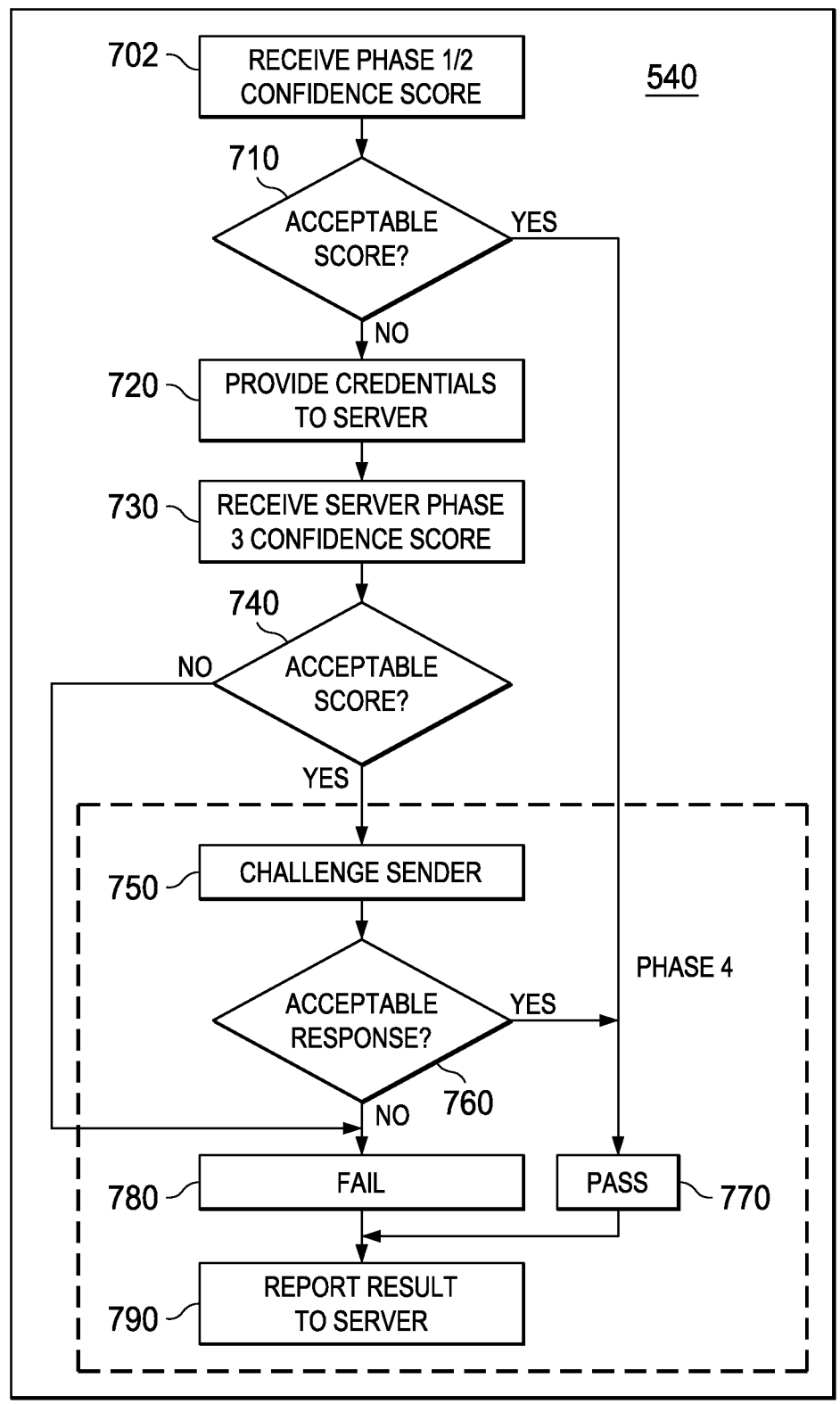
FIG. 7 is a flow chart of a method according to one or more examples of the present Specification.

FIG. 7 is a block diagram of operations performed by user 120-3 in cooperation with validation client engine 224.

In block 702, user 120-3 receives the phase 1 and 2 confident scores.

In decision block 710, user 120-3 makes a subjective judgment whether the current aggregate score is acceptable.

If the score is acceptable as-is, then the user may "PASS" message 132 in block 770.

However, if the score is not acceptable, then in block 720 user 120-3 may elect to provide credentials to authenticity validation server 300.

In block 730, user 120-3 may receive from authenticity validation server 300 a phase 3 confident score.

In decision block 740, user 120-3 may determine whether the aggregate credibility score is now acceptable.

If the score is not acceptable, then in block 780, the message has failed validation, and in block 790, client device 120-3 may report this result to authenticity validation server 300.

Returning to block 740, if the score is acceptable, but user 120-3 is not yet fully confident, then user 120-3 may elect to proceed with phase 4.

Phase 4 begins in block 750. In block 750, user 120-3 may elect to challenge sender 130, including for example an out of band challenge as described herein.

In decision block 760, user 120-3 makes a determination whether sender 130 provided an acceptable response to the challenge.

If the response was not acceptable, then in block 780, the message fails. On the other hand, if the block is acceptable, then in block 770, the message passes. In either case, in block 790, user 120-3 may report the results to authenticity validation server 300, so that authenticity validation server 300 can update its global database 352.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

Example Implementations

There is disclosed in an example, an apparatus comprising: a network interface; and one or more logic elements comprising a validation server engine operable for: receiving an unverified message via the network interface; parsing metadata of the message; analyzing the metadata in relation to a content of the message; and assigning the message a phase 1 credibility score based at least in part on the analyzing the header data.

There is further disclosed an example, wherein the metadata comprise header data.

There is further disclosed an example, wherein analyzing the metadata in relation to the content of the message comprises: determining a likely locus of origin for the message; and analyzing a body of the message to determine whether location indicators in the body are consistent with the likely locus of origin.

There is further disclosed an example, wherein the validation server engine is further operable for: analyzing publically-available data via the network interface; comparing the publically-available data to of the message; and assigning the message a phase 2 credibility score based at least in part on the comparing.

There is further disclosed an example, wherein the publically-available data comprise an account age for a sender of the message There is further disclosed an example, wherein the validation server engine is further operable for providing an aggregate phase 1 and phase 2 credibility score directed to an end user device via the network interface.

There is further disclosed an example, wherein the validation server engine is further operable for receiving credentials for accessing a private data source via the network interface.

There is further disclosed an example, wherein the validation server engine is further operable for: analyzing the private data source; comparing the private data source to the content of the message; and assigning the message a phase 3 credibility score based at least in part on the comparing.

There is further disclosed an example, wherein the validation server engine is further operable for receiving a user feedback score for the message via the network interface.

There is further disclosed an example, wherein the validation server engine is further operable for updating a global malware database based at least in part on receiving the user feedback score for the message.

There is further disclosed an example, wherein the validation server engine is further operable for receiving a result of an end user challenge, and assigning the message a phase 4 credibility score based at least in part on the receiving the result.

There is further disclosed an example, wherein the validation server engine is further operable for updating a global malware database based at least in part on receiving the result of the end user challenge.

There is further disclosed an example, wherein the validation server engine is further operable for applying at least one of anti-spam, anti-malware, anti-spyware, or anti-phishing filters to the message.

There is further disclosed in an example, one or more computer-readable mediums having stored thereon executable instructions operable for providing a validation server engine operable for: receiving an unverified message via a network interface; parsing metadata of the message; analyzing the metadata in relation to a content of the message; and assigning the message a phase 1 credibility score based at least in part on the analyzing the header data.

There is further disclosed an example, wherein the metadata comprise header data.

There is further disclosed an example, wherein analyzing the metadata in relation to the content of the message comprises: determining a likely locus of origin for the message; and analyzing a body of the message to determine whether location indicators in the body are consistent with the likely locus of origin.

There is further disclosed an example, wherein the validation server engine is further operable for: analyzing publically-available data via the network interface; comparing the publically-available data to of the message; and assigning the message a phase 2 credibility score based at least in part on the comparing.

There is further disclosed an example, wherein the validation server engine is further operable for providing an aggregate phase 1 and phase 2 credibility score directed to an end user device via the network interface.

There is further disclosed an example, wherein the validation server engine is further operable for receiving credentials for accessing a private data source via the network interface.

There is further disclosed an example, wherein the validation server engine is further operable for: analyzing the private data source; comparing the private data source to the content of the message; and assigning the message a phase 3 credibility score based at least in part on the comparing.

There is further disclosed an example, wherein the validation server engine is further operable for receiving a result of an end user challenge, and assigning the message a phase 4 credibility score based at least in part on the receiving the result.

There is further disclosed an example, wherein the validation server engine is further operable for updating a global malware database based at least in part on receiving the result of the end user challenge.

There is further disclosed an example, wherein the validation server engine is further operable for applying at least one of anti-spam, anti-malware, anti-spyware, or anti-phishing filters to the message.

There is further disclosed in an example, a method, comprising: receiving an unverified message via a network interface; parsing metadata of the message; analyzing the metadata in relation to a content of the message; and assigning the message a phase 1 credibility score based at least in part on the analyzing the header data.

There is further disclosed an example, further comprising: analyzing publically-available data via the network interface; comparing the publically-available data to of the message; and assigning the message a phase 2 credibility score based at least in part on the comparing.

There is further disclosed in an example, a method comprising the performing the instructions disclosed in any of the examples.

There is further disclosed an example, an apparatus comprising means for performing the method of any of the examples.

There is further disclosed an example, wherein the apparatus comprises a processor and memory.

There is further disclosed an example, wherein the apparatus further comprises a computer-readable medium having stored thereon software instructions for performing the method of any of the examples.

What is claimed is:

1. An apparatus comprising:
   a network interface; and
   one or more logic elements, including at least a processor and a memory, comprising a validation server engine operable for multi-phase validation, comprising:
      receiving an unverified message via the network interface;
      parsing header data of the message;
      analyzing the header data in relation to a content of the message; and
      assigning the message a phase 1 credibility score based at least in part on the analyzing the header data; and
      working cooperatively with end-user input to validate the unverified message; and
   wherein the validation server engine is further operable for:
      analyzing a publically-available database via the network interface;
      comparing the publically-available database to the content of the message; and
      assigning the message a phase 2 credibility score based at least in part on the comparing.

2. The apparatus of claim 1, wherein analyzing the header data in relation to the content of the message comprises:
   determining a likely locus of origin for the message; and
   analyzing a body of the message to determine whether location indicators in the body are consistent with the likely locus of origin.

3. The apparatus of claim 1, wherein the publically-available database comprises an account age for a sender of the message.

4. The apparatus of claim 1, wherein the validation server engine is further operable for providing an aggregate phase 1 and phase 2 credibility score directed to an end user device via the network interface.

5. The apparatus of claim 1, wherein the validation server engine is further operable for receiving credentials for accessing a private data source via the network interface.

6. The apparatus of claim 5, wherein the validation server engine is further operable for:
   analyzing the private data source;
   comparing the private data source to the content of the message; and
   assigning the message a phase 3 credibility score based at least in part on the comparing.

7. The apparatus of claim 1, wherein the validation server engine is further operable for receiving a user feedback score for the message via the network interface.

8. The apparatus of claim 7, wherein the validation server engine is further operable for updating a global malware database based at least in part on receiving the user feedback score for the message.

9. The apparatus of claim 7, wherein the validation server engine is further operable for receiving a result of an end user challenge, and assigning the message a phase 4 credibility score based at least in part on the receiving the result.

10. The apparatus of claim 9, wherein the validation server engine is further operable for updating a global malware database based at least in part on receiving the result of the end user challenge.

11. The apparatus of claim 1, wherein the validation server engine is further operable for applying at least one of anti-spam, anti-malware, anti-spyware, or anti-phishing filters to the message.

12. One or more tangible, non-transitory computer-readable mediums having stored thereon executable instructions operable for providing a validation server engine operable for providing a multi-phase authentication, comprising:
   receiving an unverified message via a network interface;
   parsing header data of the message;
   analyzing the header data in relation to a content of the message;
   assigning the message a phase 1 credibility score based at least in part on the analyzing the header data; and
   working cooperatively with end-user input to validate the unverified message; and
   wherein the validation server engine is further operable for:
      analyzing a publically-available database via the network interface;
      comparing the publically-available database to the content of the message; and
      assigning the message a phase 2 credibility score based at least in part on the comparing.

13. The one or more tangible, non-transitory computer-readable mediums of claim 12, wherein analyzing the header data in relation to the content of the message comprises:
   determining a likely locus of origin for the message; and
   analyzing a body of the message to determine whether location indicators in the body are consistent with the likely locus of origin.

14. The one or more tangible, non-transitory computer-readable mediums of claim 12, wherein the validation server engine is further operable for providing an aggregate phase 1 and phase 2 credibility score directed to an end user device via the network interface.

15. The one or more tangible, non-transitory computer-readable mediums of claim 12, wherein the validation server engine is further operable for receiving credentials for accessing a private data source via the network interface.

16. The one or more tangible, non-transitory computer-readable mediums of claim 15, wherein the validation server engine is further operable for:
   analyzing the private data source;

comparing the private data source to the content of the message; and assigning the message a phase 3 credibility score based at least in part on the comparing.

17. The one or more tangible, non-transitory computer-readable mediums of claim 16, wherein the validation server engine is further operable for receiving a result of an end user challenge, and assigning the message a phase 4 credibility score based at least in part on the receiving the result.

18. The one or more tangible, non-transitory computer-readable mediums of claim 17, wherein the validation server engine is further operable for updating a global malware database based at least in part on receiving the result of the end user challenge.

19. The one or more tangible, non-transitory computer-readable mediums of claim 12, wherein the validation server engine is further operable for applying at least one of anti-spam, anti-malware, anti-spyware, or anti-phishing filters to the message.

20. A method for providing multi-phase validation on a computing apparatus, comprising:

receiving an unverified message via a network interface;

parsing header data of the message;

analyzing the header data in relation to a content of the message;

assigning the message a phase 1 credibility score based at least in part on the analyzing the header data;

working cooperatively with end-user input to validate the unverified message;

analyzing a publically-available database via the network interface;

comparing the publically-available database to the content of the message; and assigning the message a phase 2 credibility score based at least in part on the comparing.

* * * * *

UNITED STATES PATENT AND TRADEMARK OFFICE
CERTIFICATE OF CORRECTION

PATENT NO. : 9,762,591 B2  
APPLICATION NO. : 14/583622  
DATED : September 12, 2017  
INVENTOR(S) : Neeta Srivastava et al.

Page 1 of 1

It is certified that error appears in the above-identified patent and that said Letters Patent is hereby corrected as shown below:

On the Title Page

In item (57), in Column 2, in "Abstract", Line 7, delete "end user" and insert -- end-user --, therefor.

In the Claims

In Column 19, Line 63, in Claim 4, delete "end user" and insert -- end-user --, therefor.

In Column 20, Lines 17-18, in Claim 9, delete "end user" and insert -- end-user --, therefor.

In Column 20, Line 23, in Claim 10, delete "end user" and insert -- end-user --, therefor.

In Column 20, Line 58, in Claim 14, delete "end user" and insert -- end-user --, therefor.

In Column 21, Lines 7-8, in Claim 17, delete "end user" and insert -- end-user --, therefor.

In Column 21, Line 14, in Claim 18, delete "end user" and insert -- end-user --, therefor.

Signed and Sealed this  
Tenth Day of April, 2018

Andrei Iancu  
*Director of the United States Patent and Trademark Office*